United States Patent
Whiteaway et al.

(10) Patent No.: US 6,522,811 B1
(45) Date of Patent: Feb. 18, 2003

(54) ARRAYED WAVEGUIDE GRATING

(75) Inventors: James E. Whiteaway, Sawbridgeworth (GB); George H. Thompson, Sawbridgeworth (GB); Alan Fielding, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/993,822

(22) Filed: Nov. 6, 2001

Related U.S. Application Data

(60) Provisional application No. 60/315,494, filed on Aug. 27, 2001.

(51) Int. Cl.$^7$ ................................................. G02B 6/34
(52) U.S. Cl. ........................................................ 385/37
(58) Field of Search ........................... 385/30–42, 147; 372/96, 45, 46; 257/186, 187, 21; 356/519

(56) References Cited

U.S. PATENT DOCUMENTS 5,905,573 A * 5/1999 Stallard et al. ............. 356/519
6,396,865 B1 * 5/2002 Mawst et al. ................ 372/96

* cited by examiner

Primary Examiner—Akm E. Ullah
(74) Attorney, Agent, or Firm—Lee, Mann, Smith, McWilliams, Sweeney & Ohlson

(57) ABSTRACT

An optical waveguide device for guiding an optical signal comprising a substrate, a waveguide extending at least partially across the substrate, and at least two slots extending transversely across the waveguide. The separation between the slots, the direction of propagation of the optical signal in the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation.

18 Claims, 4 Drawing Sheets

ARRAYED WAVEGUIDE GRATING

RELATED APPLICATION

This application is the non-provisional filing of Provisional Application No. 60/315,494, filed Aug. 27, 2001, the priority of which is claimed.

FIELD OF THE INVENTION

The present invention relates to an arrayed waveguide grating (AWG), and the manufacture and use of such a grating. In particular, the present invention relates to the geometry of an AWG that is suitable for, but not exclusively for providing a thermal operation.

BACKGROUND OF THE INVENTION

Optical systems increasingly use wavelength division multiplexing (WDM), in which a number of distinct optical signals are transmitted at different wavelengths, generally down an optical fibre. For example, optical communication in the so called "C" band may use 40 channels, all frequencies spaced apart by regular intervals. One optical signal can be transmitted at each frequency down a single optical fibre. There are the possibilities, for example, that 56 channels may be used in the "L" band.

A key component in WDM systems is the demultiplexer for separating the optical signals at a plurality of wavelengths into the individual channels at individual wavelengths. This may be done by using a splitter and a number of different filters tuned to the individual frequencies, by components that demultiplex the light directly, or by a combination of these components.

One approach to filtering and demultiplexing is an arrayed waveguide grating (AWG), also known as a phased-array device. The operation and design of AWGs is described, for example, in "PHASAR-based WDM-devices; principles, design and applications", Meint K. Smit, IEEE Journal of Selected Topics in Quantum Electronics Vol. 2, June 1996.

FIG. 1 illustrates a conventional AWG device. The device includes an array 11 of waveguides 3 arranged side by side on a substrate 1 and extending between an input star coupler 13 and an output star coupler 15. The input and output star couplers 13, 15 may be defined by a wide core region in which light can travel freely in the two-dimensional plane of the substrate. This region is known as the free propagation region. Input 17 and output 19 optical waveguides are divided to input light into the array 11 of waveguides and to output light respectively. There may in particular be a plurality of input waveguides 17 and/or output waveguides 19.

As an example, FIG. 2 illustrates the output star coupler of a system with a plurality of output waveguides. The ends 21 of the array waveguides 11 are usually on a geometric circle 23 of radius r whose centre is at centre 25 of an image plane 27. The output waveguides 19 are arranged on the image plane, which also constitutes a circle. Note that the centres of the circles are not coincident, and need not have equal radii.

The lengths of the individual waveguides 3 of the array 11 differ (see FIG. 1), and the shapes of the star couplers 13, 15 are chosen so that light input on the input optical waveguides 17 passes through the array of waveguides and creates a diffraction pattern on the output waveguide or waveguides, such that light of a predetermined central wavelength creates a central interference peak at the centre 25 of the image plane. Light with frequencies slightly higher or lower than the predetermined central frequency is imaged with a central interference peak slightly above or below the centre of the image plane.

In order to achieve this result the optical path length difference between adjacent waveguides of the array is chosen so that it is an integral multiple of the central wavelength. Thus light at the central wavelengths which enters the array of waveguides in phase will also leave in phase and will create the central diffraction spot at the centre of the image plane. Light with a slightly different frequency will arrive at the output star coupler with slight phase differences across the array, which will cause the light to be imaged to a spot on the image plane a little further away from the central spot.

Thus the plurality of output waveguides arranged on the output plane receive light of slightly different frequencies. Equally spaced output waveguides correspond to equally spaced frequencies, to a first order of approximation.

FIG. 2 shows the use of one or more output waveguides connected to the output star coupler 15. It is alternatively or additionally possible to arrange a plurality of input waveguides on the input star coupler with the same effect. Equally, it will be appreciated that the terms input and output are merely used for convenience, as such a device is in fact bi-directional and reciprocal in its performance.

It will be appreciated that the lengths of the individual waveguides in the array 11 are critical to the performance of the AWG. If the difference in length between the optical paths change, then so will the transmission wavelengths of the AWG filter. The optical path length is the physical path length multiplied by the refractive index of the material.

AWG filters are hence inherently temperature sensitive on account of the temperature sensitivity of the refractive index of the waveguide material and, to a lesser extent, due to the expansion coefficient of the material. For instance, in a silica-based planar waveguide device, the wavelength at the centre of the filter passband typically increases by about 0.01 nm (nanometer) per degree Celsius. In other words, for each 10 degree Celsius rise in temperature, the centre wavelength will increase by 0.1 nanometers.

Due to the decreasing wavelength spacing between adjacent optical channels (as WDM systems have developed into DWDM systems), it is desirable to have a filter which is not sensitive to changes in temperature.

Various solutions have been proposed to prevent such AWGs being affected by variations in ambient temperature.

For instance, the use of a heater or a Peltier element attached to the AWG to ensure that the AWG temperature remains at a predetermined, preferred value. Such an arrangement requires control circuitry, as well as consumes power.

It is therefore preferable that the operation of the AWG is itself largely independent of temperature i.e. the AWG operation is athermal.

"Optical Phased Array Filter Module With Passively Compensated Temperature Dependence" by G Heise et al, ECOC 98, describes one manner of stabilising such filters passively against thermal drifts. The proposed solution is to utilise a modified input coupling section whereby the input waveguide 17 is attached to a compensating rod. As the temperature changes, the thermal expansion of the compensating rod shifts the physical position of the input 17 so as to retune the filter to compensate for the temperature drift of the phased array chip. This mechanical movement of the position of the input 17 will be subject to effects such as vibration and fatigue.

European Patent application no. EP 0 919 840 A1 by Inoue et al describes an alternative athermal optical waveguide device, in which a groove is formed across the array 11 of waveguides. The groove is then filled with a material having a temperature co-efficient of refractive index of different sign from that of the temperature co-efficient of refractive index of the waveguide. For example, the groove is typically filled with silicone, which has a refractive index temperature co-efficient of −30 x that of silica (the typical material used to form the waveguides). Thus by using silicone filled slots which vary in length between the array guides by about $\frac{1}{30}^{th}$ of the path length difference between the individual array guides, the AWG filter becomes temperature insensitive. The centre frequencies of the filter pass bands are therefore also temperature insensitive.

However, the main problem with this approach is that the diffraction loss across these slots is relatively significant. This is due to the fact that the optical energy is not guided by a waveguide across the slot.

"Athermal and Center Wavelength Adjustable Arrayed-Waveguide Grating" by K Maru et al, OFC 2000, describes an alternative manner of providing an athermal AWG. The proposed AWG has several trenches with a crescent shape formed in the input star coupler 13. Such trenches (or slots) are tilled with silicone, such that the temperature dependent propagation phase change in the waveguide array is cancelled out. Compared with the Inoue patent application, this structure has advantages that the diffraction loss is significantly reduced. This is principally due to the fact that the diffraction loss from the trench is then confined in direction to that normal to the substrate, since the optical waves propagating through the star coupler are already and intentionally diffracting freely in the plane of the waveguide. The diffraction across a slot in the arrayed waveguides by comparison is in two dimensions and hence leads to a larger loss penalty. However, there are limits to how much the loss can be reduced using this approach as diffraction loss in the direction normal to the substrate can still occur.

It is therefore an object of the present invention to provide an arrayed waveguide that substantially addresses one or more other problems of the prior art.

SUMMARY OF THE INVENTION

According to a first aspect, the present invention provides an optical waveguide device for guiding an optical signal comprising a substrate, a waveguide extending at least partially across the substrate, and at least two slots extending transversely across the waveguide, wherein the separation between the slots, in the direction of propagation of the optical signal in the waveguide, is substantially $$\left(\frac{n\Delta\lambda}{2}\right),$$

where n is an odd integer and $\Delta\lambda$ the difference in the wavelength of the radiation and guided modes of the optical signal resolved in the direction of propagation.

In other words the radiation generated at one slot can be viewed as destructively interfering with that at the next slot, or as constructively interfering with the guided wave after the next slot. Alternatively the phase advance of the radiation fields compared with the guided mode introduces a component of converging wavefront that partially focuses the radiation onto the guide at the far side of the next slot.

Slots provide no waveguide action and allow free diffraction to occur. By choosing the separation of the slots so that the radiation lost from one slot (or groove) interferes destructively with that from the next slot, this results in some of the radiation from the first slot being effectively coupled back into the waveguide at the next slot. This reduces the total insertion loss of the slots. It will be appreciated that an optical signal may comprise a variety of wavelengths. In the preferred embodiment, the separation between the slots is defined by the centre wavelength of the optical signal, although it will be appreciated that the invention will work with any wavelength in, or close to, the range of wavelengths contained within the optical signal.

The loss reduction obtained by selecting the optimum gap spacing is maintained within 0.01 dB of the minimum for a wavelength variation of about 50 nm from the optimum design value $$\left(\frac{n\Delta\lambda}{2}\right).$$

This implies that this loss reduction technique would benefit from a filter operating over the whole of the 'L' or 'C' band in a WDM transmission system. However, the effect is still seen to be significant for a wavelength ($\Delta\lambda$) variation of up to ±100 nm from the optimum value of $\Delta\lambda$.

Preferably the slot separation is the separation between the respective side of each slot upon which the optical signal is first incident. For optimum performance, it is preferable that the separation between the start of each slot is $$\left(\frac{n\Delta\lambda}{2}\right).$$

This is because the field of the optical signal diffracts outwardly from the slot as soon as it leaves the waveguiding region.

Preferably the device comprises at least two waveguides extending at least partially across the substrate. The invention may be applied to waveguide devices containing one or more waveguides. In such instances, as the wavelength of the optical signal being transmitted along the respective waveguides may differ slightly, then the separation between the slots in any respective waveguide may only be an approximation of $$\left(\frac{n\Delta\lambda}{2}\right),$$

in order to ease manufacture.

Preferably wherein said slots extend transversely across said at least two waveguides. In order to provide different thicknesses of slot at the intersection of a slot with each respective waveguide, the slot geometry may be wedge shaped, or indeed any appropriate shape.

Preferably the device comprises at least three of said slots each extending transversely across the waveguide, wherein the pitch between the slots in the direction of propagation of the optical signal is substantially $$\left(\frac{n\Delta\lambda}{2}\right).$$

The diffraction loss across a slot increases superlinearly with slot width and so it is preferable to use numerous small slots in preference to one or a couple of large slots. By spacing apart these slots as per the present invention, then losses are further decreased.

Preferably the device comprises an array of waveguides extending at least partially across the substrate. Such an array may be used for a variety of optical processing functions such as, optical multiplexing, demultiplexing, or dispersion compensation.

Preferably the length of the slots in the direction of propagation is a function of the optical length of the respective waveguide across which the slots transversely extends.

Preferably the device comprises an arrayed waveguide grating (AWG), the AWG further comprising a first coupling region and a second coupling region, with the array of waveguides extending between the two coupling regions.

Preferably the slots are less than 10 microns in length in the direction of propagation of the optical signal. Slots of approximately 10 microns or less in width have been shown to be substantially less lossy than larger size slots. Alternatively, slots can be of 5 microns or less in width, with such slots being even less lossy per unit length than 10 micron slots. The width of the slot used is likely to be set by the technology used for their fabrication.

Preferably wherein said slots contain a different material from that forming the waveguide. For instance, the different material can have a temperature coefficient of refractive index of different sign to that of the material forming the waveguide, such as silicone.

Alternatively, the different material may have electro-optic properties, or indeed any optical properties arranged to change the optical signal passing along the guide in a controllable manner.

A second aspect of the present invention provides a method of manufacturing an optical waveguide device for guiding an optical signal, the method comprising steps of: forming a waveguide in a substrate, waveguide extending at least partially across the substrate; and forming at least two slots extending transversely across the waveguide, such that the separation between the two slots, in the direction that an optical signal would normally propagate along the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation. Of course, various alternative manufacturing processes can be utilised to implement this method, as will be apparent to a skilled person. For instance, waveguide layers can be deposited using PECVD (plasma enhanced chemical vapour deposition). After deposition the layers can be consolidated in an annealing process, and the slots etched using RIE (reactive ion etching).

A third aspect of the present invention provides an optical apparatus for processing an optical signal, the apparatus comprising at least one input for receiving an optical signal; at least one output for providing an optical signal for onward transmission; and an optical waveguide device for guiding an optical signal comprising a substrate, a waveguide extending at least partially across the substrate, and at least two slots extending transversely across the waveguide, wherein the separation between the slots, in the direction of propagation of the optical signal in the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation.

A fourth aspect of the present invention provides a node for a telecommunications network, the node being arranged to transmit and receive a telecommunication signal, and the node comprising at least one optical waveguide device for guiding an optical signal comprising a substrate, a waveguide extending at least partially across the substrate, and at least two slots extending transversely across the waveguide, wherein the separation between the slots, in the direction of propagation of the optical signal in the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation. A final aspect of the present invention provides a method of processing an optical signal, the method comprising receiving an input optical signal; processing the optical signal; outputting at least a portion of the processed optical signal, wherein the processing step includes transmitting the optical signal along an optical waveguide device, the waveguide device comprising a substrate, a waveguide extending at least partially across the substrate, and at least two slots extending transversely across the waveguide, wherein the separation between the slots, in the direction of propagation of the optical signal in the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation.

BRIEF DESCRIPTION OF THE DRAWINGS

For a better understanding of the invention, specific embodiments will now be described, purely by way of example only, with reference to the accompanying drawings in which.

DETAILED DESCRIPTION OF PREFERRED EMBODIMENTS

Figure 1:
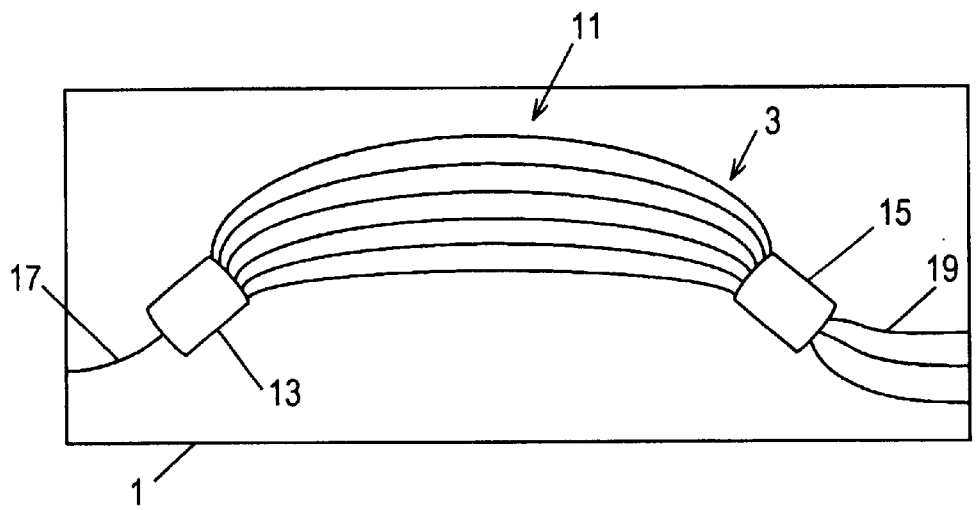
FIG. 1 shows a known AWG device (PRIOR ART)
Figure 2:
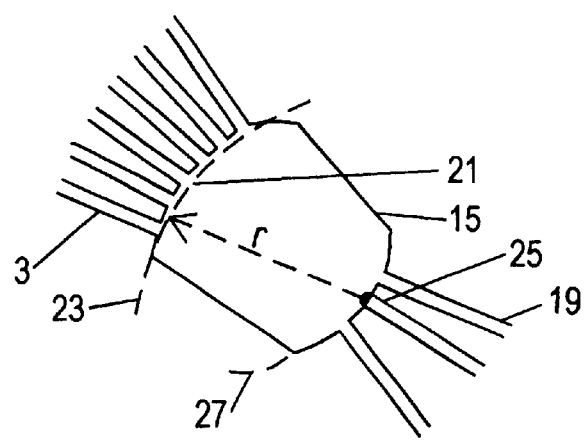
FIG. 2 is a schematic drawing of the output star coupler of the AWG of FIG. 1 (PRIOR ART)
Figure 3:
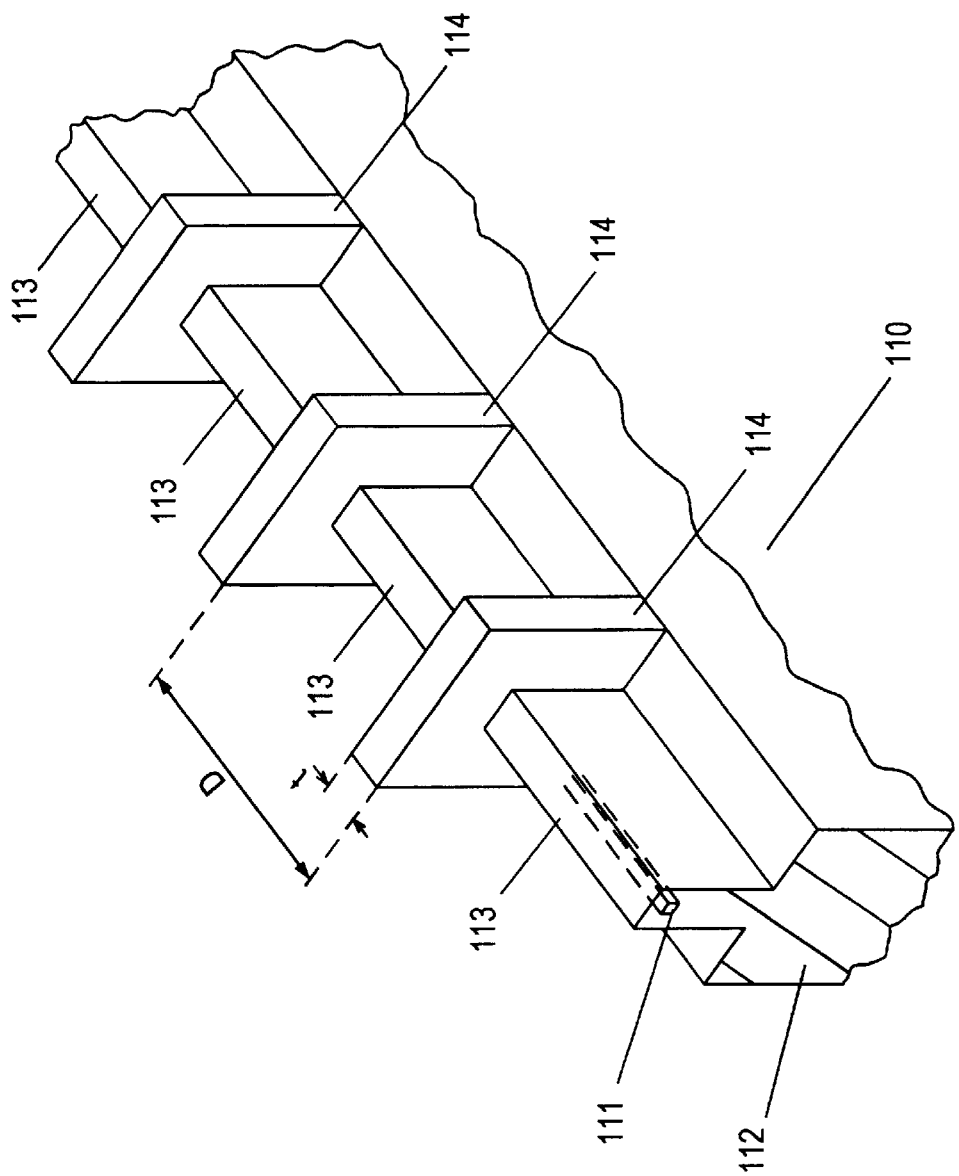
FIG. 3 is a sectioned perspective schematic representation of part of a waveguide in accordance with a first embodiment of the invention.

FIG. 3 shows a monolithic optical waveguide 110 having an optical core 111 surrounded by optical cladding material 112 which has a lower refractive index than that of the core 111. The waveguide is divided into a number of concatenated waveguide sections 113 by a series of slots 114. The slots 114 in the preferred embodiment are physically slots in the waveguide core 111, which extend out into the surrounding material (not all of which is shown). Each slot is of width t (i.e. of length t in the direction of propagation of the optical signal), with the separation between the leading edges of the slots being D. For convenience of illustration only, the core of the waveguide is shown as lying within a portion of the cladding depicted in the form of an upstanding rib—in some circumstances this may be the actual physical arrangement, but this is not necessary.

The waveguide 110 is arranged to guide an optical signal of a predetermined wavelength λ. The distance D is selected to be approximately $$\left(\frac{n\Delta\lambda}{2}\right),$$

where n is an odd integer and Δλ the difference in wavelength of the radiation and guided modes of the optical signal resolved in the direction of propagation. The difference in effective wavelengths of the guided and radiative modes occurs due to the different refractive indices of the materials that the modes will respectively propagate through. The guided mode will propagate across the slot and into the next waveguiding section, whilst the radiative (radiation) mode will propagate outwardly from the slot into the region/material (if any) surrounding the waveguide. The $$\left(\frac{n\Delta\lambda}{2}\right)$$

criteria ensures that a relative phase shift of π (nπ) radians occurs between the slots. The criteria thus results in the partial destructive interference of the non-guided (i.e. radiated) signal(s) at the next slot.

Figure 4:
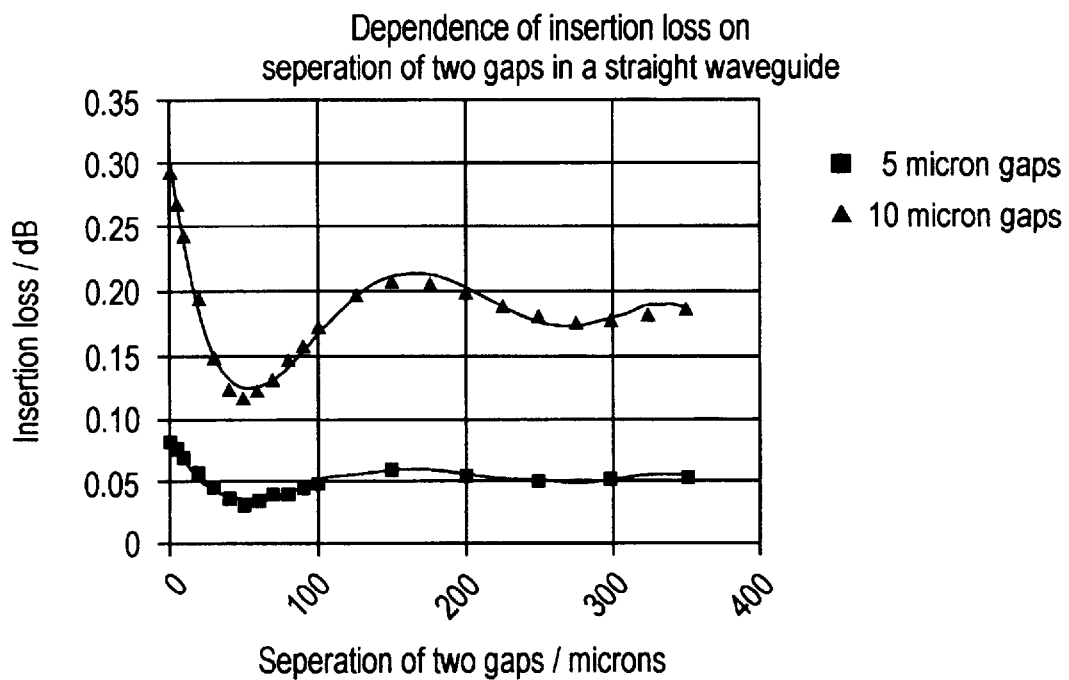
FIG. 4 shows the dependence of insertion loss on separation of two slots in a straight waveguide.

Various 3-D computer modes can be utilised to calculate the distance corresponding to $$\left(\frac{n\Delta\lambda}{2}\right),$$

based on the properties of the materials forming the waveguide, slot and surrounding structure. For instance, the BPM (Beam Propagation Method) program by Optiwave Corporation of Ottawa, Canada. An optical signal being guided along the waveguide will not be guided through the slot, but will diffract out as it enters the slot. FIG. 4 shows how the loss attributable to two slots in a straight waveguide formed from silica on silicon varies with the separation between the two slots (or gaps) for slot sizes of respectively 5 micron and 10 micron (i.e. t=5 micron and 10 micron respectively, with D being varied) for an input optical signal of wavelength 1545 nm. Firstly, it will be noted that the loss for a 10 micron slot is always larger than that of a 5 micron slot. Secondly, the loss for each slot size shows a dependence on the separation (D) similar to a damped oscillatory behaviour. This loss arises from the interaction of the radiation from one slot with that from the next, with the effect decaying as the slot separation D increases. This behaviour is due to the radiation lost from one slot (due to the optical signal diffracting out as it enters the slot and hence not coupling into the successive waveguide section) interacting with that from the next slot and interfering either constructively or destructively depending upon the relative phase of the signals. By appropriately choosing the separation D of the two slots to be $$\left(\frac{n\Delta\lambda}{2}\right)$$

then the loss is minimised. This is believed to be due to the interaction between the optical signal that has been diffracted out from the first slot into the region surrounding the waveguide interfering with that of the portion of the optical signal that has been diffracted from the second slot so as to optimally couple the resultant optical signal back into the waveguide section after the second slot.

Thus, the losses due to placing the slot within the waveguide may be minimised by optimal separation of the slots. As can be seen from FIG. 4, small variations in the separation from that of minimum insertion loss will achieve a similar, albeit not as pronounced decrease in loss.

The minimum insertion loss in both cases is for a gap separation of approximately 55 microns. This corresponds to a separation of $$\left(\frac{n\Delta\lambda}{2}\right)$$

i.e. n=1.

Figure 5:
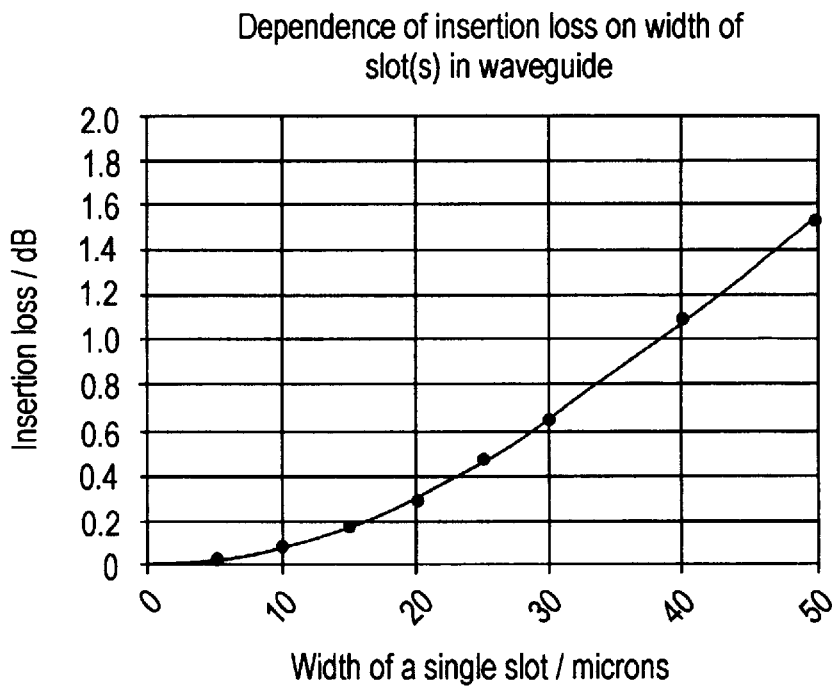
FIG. 5 shows the dependence of insertion loss on width of slot (S) in a waveguide.

FIG. 5 shows the dependence of insertion loss on width (t) of a slot in a waveguide. As can be seen, the insertion loss varies super linearly with slot width. Thus, if a total slot width of 20 microns is desired in a waveguide, it will be appreciated that a single slot of width 20 microns has an insertion loss of approximately 0.3 dB, whilst a slot of width 10 micron has an insertion loss of approximately 0.1 dB. In other words, it is preferable to utilise a series of small slots to achieve a predetermined total slot width, rather than a single slot of the same total width.

Figure 6:
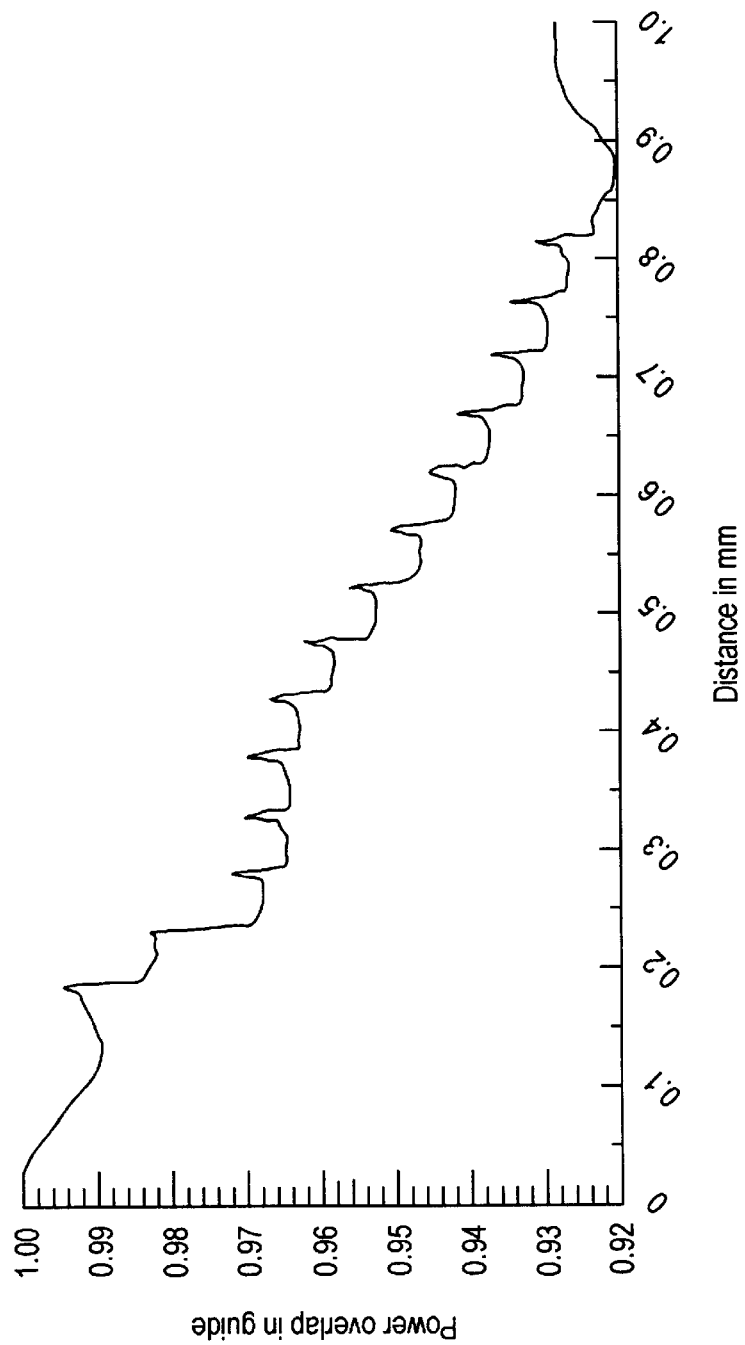
FIG. 6 shows the relative power in a length of waveguide having fourteen 10 micron gaps of 50 micron separation period.

FIG. 6 shows this effect, by showing the relative power retained in the optical waveguide as a function of distance along the waveguide for a waveguide comprising 14 slots, each of 10 micron width (t), with a slot repeat period (i.e. D) of 50 microns. The steps in the graph show the relative power being lost from the waveguide as a function of distance due to the effect of each successive slot. The total loss from the waveguide for all of these slots is 0.36 dB (i.e. 10 log$_{10}$ 0.92), which is substantially less than the 1.4 dB loss that would result from 14 well separated gaps having the same overall equivalent width. Whilst the first embodiment of the present invention has been described in respect of a waveguide having slots formed therein which are simply gaps within the waveguide, it will be appreciated that the slots may be formed of any material, or alternatively may indeed be gaps filled with another material. For instance, an athermal arrayed waveguide grating could be constructed utilising slots of linearly increasing width etched across the array guides. Such slots would be filled with a material that exhibits a large temperature sensitivity of its refractive index which has an opposite sign to that of the array guide material.

For instance, in silica waveguides one can use silicone-filled slots which vary in length (t) between the array guides by about 1/30 of the path length difference between array guides. Since the temperature dependence of the refractive index of silicone is approximately −30 times that of silica, the path length difference for the AWG filter hence becomes temperature insensitive. As the optical path lengths differences across the array of guides determines the filter pass band centre frequencies, the filter thus also becomes temperature insensitive. By ensuring that the separation of the individual slots is approximately $$\left(\frac{n\Delta\lambda}{2}\right),$$

as well as utilising relatively small width slots, then it will be appreciated that the optical losses within the waveguide will be minimised.

The invention has been described with reference to a number of specific embodiments. However, the skilled person will realise that the embodiments are not limiting that the invention may be implemented in a number of different ways.

The skilled person will, for instance, appreciate that any material may be utilised in the slots, e.g. an electro optic material, whereby an electrical signal is applied so as to induce a change in the optical properties of the material.

The waveguide may form part of an AWG that may be used to demultiplex a group of WDM (wave division multiplex) channels into a plurality of different output signals, one or more in each channel. Alternatively the reciprocity of the device allows the device to also carry out the reverse process of multiplexing.

There are a number of alternative approaches for defining waveguides on a substrate and any of these may be used in a waveguide according to the invention. The substrate need not be rectangular. The slots, whilst having been illustrated as being approximately rectilinear in shape, may be of any desired shape. The invention is not just applicable to conventional glass waveguides, but also to polymer waveguides.

Moreover, although the invention has been described with reference to "input" and "output" waveguides these may in practice be reversible. Accordingly, the terms "input" and "output" may be considered as nothing more than labels indicating opposite ends of the waveguide.

What is claimed is:

1. An optical waveguide device for guiding an optical signal comprising a substrate, a waveguide extending at least partially across the substrate, and at least two slots extending transversely across the waveguide, wherein the separation between the slots, in the direction of propagation of the optical signal in the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation.

2. A device as claimed in claim 1, wherein n=1.

3. A device as claimed in claim 1, wherein said separation is the separation between the respective side of each slot upon which the optical signal is first incident.

4. A device as claimed in claim 1, wherein the device comprises at least two waveguides extending at least partially across the substrate.

5. A device as claimed in claim 4, wherein said slots extend transversely across said at least two waveguides.

6. A device as claimed in claim 1, comprising at least three of said slots each extending transversely across the waveguide, wherein the pitch between the slots in the direction of propagation of the optical signal is substantially $$\left(\frac{n\Delta\lambda}{2}\right).$$

7. A device as claimed in claim 1, comprising an array of waveguides extending at least partially across the substrate.

8. A device as claimed in claim 7, wherein the length of the slots in the direction of propagation is a function of the optical length of the respective waveguide across which the slots transversely extends.

9. A device as claimed in claim 7, wherein said device comprises an arrayed waveguide grating (AWG), the AWG further comprising a first coupling region and a second coupling region, with the array of waveguides extending between the two coupling regions.

10. A device as claimed in claim 1, wherein said slots are less than 10 microns in length in the direction of propagation of the optical signal.

11. A device as claimed in claim 1, wherein said slots contain a different material from that forming the waveguide.

12. A device as claimed in claim 11, wherein said different material has a temperature coefficient of refractive index of different sign to that of the material forming the waveguide.

13. A device as claimed in claim 11, wherein said different material is silicone.

14. A device as claimed in claim 11, wherein said different material has electro-optic properties.

15. A method of manufacturing an optical waveguide device for guiding an optical signal, the method comprising steps of:

forming a waveguide in a substrate, waveguide extending at least partially across the substrate; and forming at least two slots extending transversely across the waveguide, such that the separation between the two slots, in the direction that an optical signal would normally propagate along the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation.

16. An optical apparatus for processing an optical signal, the apparatus comprising at least one input for receiving an optical signal;

at least one output for providing an optical signal for onward transmission; and an optical waveguide device for guiding an optical signal comprising a substrate, a waveguide extending at least partially across the substrate, and at least two slots extending transversely across the waveguide, wherein the separation between the slots, in the direction of propagation of the optical signal in the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation.

17. A node for a telecommunications network, the node being arranged to transmit and receive telecommunication signals, and the node comprising at least one optical waveguide device for guiding an optical signal comprising a substrate, a waveguide extending at least partially across the substrate, and at least two slots extending transversely across the waveguide, wherein the separation between the slots, in the direction of propagation of the optical signal in the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation.

18. A method of processing an optical signal, the method comprising receiving an input optical signal;

processing the optical signal; and outputting at least a portion of the processed optical signal, wherein the processing step includes transmitting the optical signal along an optical waveguide device, the waveguide device comprising a substrate, a waveguide extending at least partially across the substrate, and at least two slots extending transversely across the waveguide, wherein the separation between the slots, in the direction of propagation of the optical signal in the waveguide, is substantially $$\left(\frac{n\Delta\lambda}{2}\right),$$

where n is an odd integer and $\Delta\lambda$ the difference in wavelength of the radiation and guided modes of the optical signal resolved in the direction of propagation.

* * * * *